United States Patent [19]
Ishigaki et al.

[11] 4,204,091
[45] May 20, 1980

[54] CANCELLATION OF INTERFERENCE DISTORTIONS CAUSED BY INTERMODULATION BETWEEN FM SIGNALS ON ADJACENT CHANNELS

[75] Inventors: Yukinobu Ishigaki; Teruo Muraoka, both of Yokohama, Japan

[73] Assignee: Victor Company of Japan, Limited, Japan

[21] Appl. No.: 887,813

[22] Filed: Mar. 17, 1978

[30] Foreign Application Priority Data
Mar. 21, 1977 [JP] Japan .................................. 52/30839
Apr. 19, 1977 [JP] Japan .................................. 52/44840

[51] Int. Cl.² ............................................ H04H 5/00
[52] U.S. Cl. ......................... 179/1 GB; 179/100.4 ST
[58] Field of Search ....... 179/1 GB, 1 GQ, 100.4 ST, 179/100.1 TD, 1 G

[56] References Cited
U.S. PATENT DOCUMENTS

| | | | |
|---|---|---|---|
| 3,936,619 | 2/1976 | Sugimoto et al. | 179/100.4 ST |
| 3,943,303 | 3/1976 | Masuda et al. | 179/100.4 ST |
| 3,985,978 | 10/1976 | Cooper | 179/1 GQ |
| 3,989,903 | 11/1976 | Cooper et al. | 179/1 GQ |

*Primary Examiner*—Douglas W. Olms
*Attorney, Agent, or Firm*—Robert E. Burns; Emmanuel J. Lobato; Bruce L. Adams

[57] ABSTRACT

A crosstalk cancellation circuit includes a pair of input terminals to which interference affected FM signals are applied and a pair of output terminals from which distortionless demodulated signals are delivered. For each transmission channel an envelope detector is provided which is connected to the input terminal to detect the envelope of the FM signal. A closed-loop feedback circuits are cross-coupled across the output terminals to process the signals thereat with the detected envelopes to derive an offset signal for each channel, which is combined with a frequency-demodulated signal of the FM signal of each channel.

14 Claims, 5 Drawing Figures

$$U = \frac{X}{1-2X}$$
$$V = \frac{Y}{1-2Y}$$

CANCELLATION OF INTERFERENCE DISTORTIONS CAUSED BY INTERMODULATION BETWEEN FM SIGNALS ON ADJACENT CHANNELS

BACKGROUND OF THE INVENTION

The present invention relates generally to apparatus for eliminating distortions caused by intermodulation between two frequency-modulated signals on adjacent transmission channels, and more particularly to such apparatus for CD-4 quadraphonic sound recording and reproducing systems in which the crosstalk between adjacent channels varies in magnitude and phase as a function of time.

In the CD-4 quadraphonic sound recording system the electrical signals obtained from the four microphones, left-front ($L_f$), left-rear ($L_r$), right-front ($R_f$) and right-rear ($R_r$), are combined to produce sum signals ($L_f+L_r$) and ($R_f+R_r$) and difference signals ($L_f-L_r$) and ($R_f-R_r$). A frequency translation of the difference signals are effected by frequency modulation on a 30 KHz carrier. The frequency-translated FM signal ($L_f-L_r$) is then combined with the baseband sum signal ($L_f+L_r$) and recorded along the left track of a groove and the frequency-translated FM signal ($R_f-R_r$) is combined with the baseband sum signal ($R_f+R_f$) and recorded along the right sound track of the groove. Each of the separate tracks serves as a transmission channel for the frequency division muliplexed (FDM) signals. In the sound reproduction process, the frequency-translated signal on each transmission channel undergoes frequency demodulation. However, the pickup stylus of a playback system acts as a principal source of crosstalk between the two channels so that intermodulation or interference occurs through the crosstalk path between the frequency-modulated signals of the separate channels. Furthermore, the magnitude and phase of the crosstalk through such transducers varies as a function of time.

Crosstalk cancellation circuits have been proposed in the past to compensate for the interference distortion caused by the intermodulation of the signals on adjacent channels. However, the prior art crosstalk cancellation circuits are not satisfactory because they are incapable of cancelling such magnitude and phase component distortions which vary as a function of time.

SUMMARY OF THE INVENTION

The present invention is based on mathematical analyses of intermodulation through crosstalk paths having magnitude and phase shift variations with time. The mathematical analyses have resulted in a discovery that the distortion components of a frequency-demodulated signal can be cancelled with an offset signal derived from the envelope of the frequency-modulated signal.

An object of the invention is to provide a crosstalk cancelling circuit which includes an envelope detector for detecting the envelope of a frequency-modulated signal of each transmission channel and generating an offset signal from the detected envelope and cancel the interference distortion contained in a frequency-demodulated signal with the offset signal.

BRIEF DESCRIPTION OF THE DRAWINGS

This and other objects, features and advantages of the invention will be understood from the following description when taken in conjunction with the accompanying drawings, in which.

DETAILED DESCRIPTION

Figure 1:
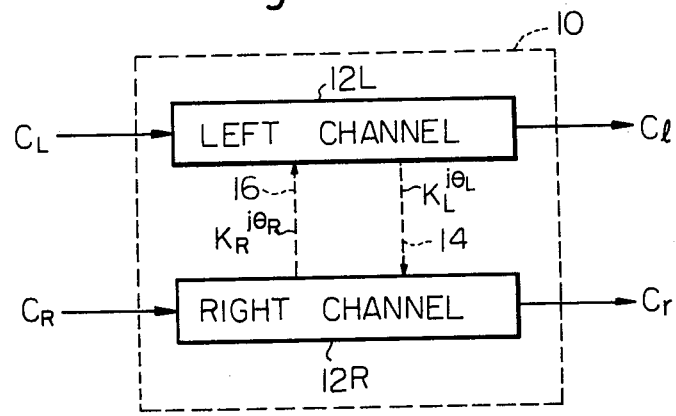
FIG. 1 is a schematic illustration of adjacent channels each containing frequency-modulated audio signals showing crosstalk paths between them.

In FIG. 1 of the drawings, a transducer or pickup stylus of a CD-4 quadraphonic system is represented schmatically by a broken-line rectangle 10 which includes a left channel transducer 12L and a right channel transducer 12R. These transducers are shown electromagnetically coupled by crosstalk paths 14 and 16. The frequency-modulated signals on the left and right channels of a record groove designated $C_L$ and $C_R$, respectively, are applied to the left and right transducers 12L, 12R and through the crosstalk paths 14 and 16 they are distorted in waveform. The output signals from the transducers 12L and 12R are designated $C_l$ and $C_r$ which contain the input signals plus the crosstalk signal components $K_R e^{j\theta}R$ and $K_L e^{j\theta}L$, respectively, where $K_R$ and $K_L$ are crosstalk ratios from the right to left and the left to right channels, respectively, and $\theta_R$ and $\theta_L$ represent phase shifts present in the respective crosstalk paths.

A quantitative analysis of the input and output signals gives the following relations:

$$C_L = \cos\{\omega_c t + f(t)\} \tag{1L}$$

$$C_R = \cos\{\omega_c t + g(t)\} \tag{1R}$$

$$C_l = \cos\{\omega_c t + f(t)\} + K_R \cos\{\omega_c t + g(t) + \theta_R\} \tag{2L}$$
$$= \sqrt{1 + K_R^2 + 2K_R \cos\{f(t) = g(t) - \theta_R\}} \times$$
$$\cos\left[\omega_c t + f(t) - \tan^{-1}\frac{K_R \sin\{f(t) - g(t) - \theta_R\}}{1 + K_R \cos\{f(t) - g(t) - \theta_R\}}\right]$$

$$C_r = \cos\{\omega_c t + g(t)\} + K_L \cos\{\omega_c t + f(t) + \theta_L\} = \tag{2R}$$
$$\sqrt{1 + K_L^2 + 2K_L \cos\{g(t) - f(t) - \theta_L\}} \times$$
$$\cos\left[\omega_c t + g(t) - \tan^{-1}\frac{K_L \sin\{g(t) - f(t) \theta_L\}}{1 + K_L \cos\{g(t) - f(t) - \theta_L\}}\right]$$

where, $\omega_t$ is a carrier frequency which is frequency-modulated by left and right modulating signals f(t) and g(t).

Equation 2L indicates that the intermodulation results in a left-channel FM signal having a varying amplitude or envelope distortion which is represented by the following Equation:

$$E_{nVL}(t) = \sqrt{1 + K_R^2 + 2K_R \cos\{f(t) - g(t) - \theta_R\}} \tag{3L}$$

and a phase component distortion represented by $$\cos\left[-\tan^{-1}\frac{K_R \sin\{f(t) - g(t) - \theta_R\}}{1 + K_R f(t) - g(t) - \theta_R}\right] \tag{4L}$$

Likewise, Equation 2R indicates that the envelope distortion of the right channel FM signal is represented by $$E_{nVR}(t) = \sqrt{1 + K_L^2 + 2K_L \cos\{f(t) - f(t) - \theta_L\}} \quad (3R)$$

and the phase component distortion is represented by $$\cos[-\tan^{-1} \frac{K_L \sin\{g(t) - f(t) - \theta_L\}}{1 + K_L g(t) - f(t) - \theta_L}] \quad (4R)$$

It will be seen that the envelope distortions are function of crosstalk ratios and as a function of phase shifts in the crosstalk paths.

When the output signals $C_l$ and $C_r$ are frequency-demodulated, the demodulated left and right output signals $e_L(t)$ and $e_R(t)$ are respectively given as follows:

$$e_L(t) = \frac{f(t) + K_R^2 g'(t) + K_R\{f(t) + g'(t)\}\cos\{f(t) - g(t) - \theta_R\}}{1 + K_R^2 + 2K_R\cos\{f(t) - g(t) - \theta_R\}} \quad (5L)$$

$$e_R(t) = \frac{g'(t) + K_L^2 f(t) + K_L\{g'(t) + f(t)\}\cos\{g(t) - f(t) - \theta_L\}}{L + K_L^2 + 2K_L\cos\{g(t) - f(t) - \theta_L\}} \quad (5R)$$

where, f'(t) and g'(t) are the recovered signals which are identical to signals f(t) and g(t), respectively, if no distortion is contained in the recovered signals.

It will be seen that the denominators of Equations (5L) and (5R) are equal to the square values of the envelopes given by Equations (3L) and (3R), respectively.

Figure 2:
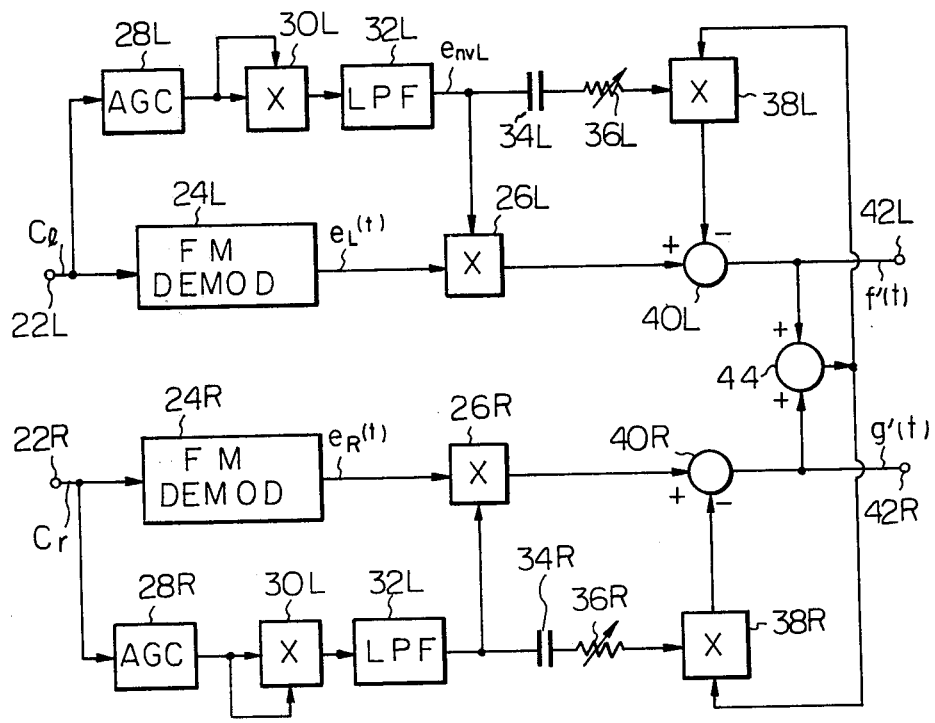
FIG. 2 is an illustration of a first embodiment of the invention.

FIG. 2 is an illustration of a first preferred embodiment of the invention. The signals $C_l$ and $C_r$ derived from the output of transducer 10 are applied respectively to left and right input terminals 22L and 22R of a crosstalk cancellation circuit 20. The input signals are respectively frequency-demodulated by demodulators 24L and 24R and applied to analog multipliers 26L and 26R respectively. The input signals $C_l$ and $C_r$ are also applied to automatic-gain controlled amplifiers 28R and 28L, respectively, and thence to squaring circuits 30L and 30R. Lowpass filters 32L and 32R respectively filter out the high frequency components of the input signals so that the outputs therefrom are respectively the envelope signals $E_{nVL}(t)$ and $E_{nVR}(t)$ given by Equations (3L) and (3R), respectively. Through the squaring and filtering actions of the circuits 30 and 32 of both channels, the signal at the output of lowpass filter 32L is a squared envelope of the left signal $C_l$ and the signal at the output of lowpass filter 32R is a squared envelope of the right signal $C_r$ as given by the following Equations:

$$e_{nVL}(t) = 1 + K_R^2 + 2K_R \cos\{f(t) - g(t) - \theta_R\} \quad (6L)$$

$$e_{nVR}(t) = 1 + K_L^2 + 2K_L \cos\{g(t) - f(t) - \theta_L\} \quad (6R)$$

The squared envelope signal $e_{nVL}(t)$ and $e_{nVR}(t)$ are then applied to the multipliers 26L and 26R respectively. Since the outputs from the demodulators 24L and 24R are signals $e_L(t)$ and $e_R(t)$ given respectively by Equations (5L) and (5R), the outputs from the multipliers 26L and 26R represent the numerators of these Equations, respectively, which are rewritten as follows:

$$e_{nVL}(t) \times e_L = f(t) + K_R^2 g'(t) + K_R\{f(t) + g'(t)\} \times \cos\{f(t) - g(t) - \theta_R\} \quad (7L)$$

$$e_{nVR}(t) \times e_R = g'(t) + K_L^2 f(t) + K_L\{f(t) + g'(t)\} \times \quad (7R)$$

-continued
$$\cos\{g(t) - f(t) - \theta_L\}$$

It is observed from Equations 7L and 7R that the first term of each of these Equations is the wanted signal and the second term represents the crosstalk signal, and the third term is the component resulting from the intermodulation of the frequency-modulated left- and right-channel signals. If each of the cross-talk ratios $K_L$ and $K_R$ is of the order of 1/10, the second terms of Equations 7L and 7R has a signal level of −40 dB, a value which can be neglected from consideration. Therefore, it is the third terms of these Equations which must be considered for cancellation.

DC blocking capacitors 34L and 34R are provided to block the passage of the DC components of the signals derived from the lowpass filters 32L and 32R, as given by Equations 6L and 6R, respectively, so that the signals representing the third terms of Equations 6L and 6R are passed through the capacitors to attenuators 36L and 36R where the signal level of these components is reduced to a 50% level. Thus, multipliers 38L and 38R are fed with a signal representing $K_R \cos\{f(t) - g(t) - \theta_R\}$ and a signal representing $K_L \cos\{g(t) - f(t) - \theta_L\}$, respectively. An adder 44 is connected between output terminals 42L and 42R from which the wanted signals f'(t) and g'(t) will be delivered respectively. The output of the adder 44 is coupled to the multipliers 38L and 38R. Therefore, it will be understood that the output of the multiplier 38L equals to the third term of Equation (7L) and the output of the multiplier 38R likewise equals to the third term of Equation (7R). A subtractor 40L is provided having its negative input connected to the output of multiplier 38L and its positive input connected to the output of multiplier 26L. Since the output from the multiplier 26L is represented by Equation (7L), the unwanted third term of this equation is cancelled in the subtractor 40L and the wanted signal f'(t) is obtained at the output terminal 42L. In the same manner, a subtractor 40R is provided to cancel the unwanted third term of Equation (7R) by the output from multiplier 38R to generate the wanted signal g'(t) at the output terminal 42R.

An alternative method of eliminating the intermodulation distortion will be described. Since the crosstalk ratios $K_R$ and $K_L$, being assumed to be small, can be neglected from consideration, Equation 5L and 5R can be rewritten as follows:

$$e_L(t) = f(t) - \{f'(t) - g'(t)\} \frac{K_R \cos\{f(t) - g(t) - \theta_R\}}{1 + 2K_R \cos\{f(t) - g(t) - \theta_R\}} \quad (8L)$$

$$e_R(t) = g'(t) + \{f'(t) - g'(t)\} \frac{K_L \cos\{f(t) - g(t) + \theta_L\}}{1 + 2K_L \cos\{f(t) - g(t) + \theta_L\}} \quad (8R)$$

$$e_L(t) = f(t) - \{f'(t) - g'(t)\} \frac{X(t)}{1 + 2X(t)} \quad (9L)$$

$$e_R(t) = g'(t) + \{f'(t) - g'(t)\} \frac{Y(t)}{1 + 2Y(t)} \quad (9R)$$

where, $X(t) = K_R \cos\{f(t) - g(t) - \theta_R\}$ and $Y(t) = K_L \cos\{f(t) - g(t) - \theta_L\}$.

The second terms of Equations 9L and 9R are the unwanted distortion components, so that these Equations can be further rewritten as follows:

$$e_L(t) = f(t) - D_{iSL}(t) \quad (10L)$$

$$e_R(t) = g'(t) - D_{iSR}(t) \quad (10R)$$

Likewise, Equations 3L and 3R can also be rewritten as follows:

$$E_{nVL}(t) \approx 1 + K_R \cos\{f(t) - g(t) - \theta_R\} \quad (11L)$$

$$E_{nVR}(t) \approx 1 + K_L \cos\{f(t) - g(t) + \theta_R\} \quad (11R)$$

Figure 3:
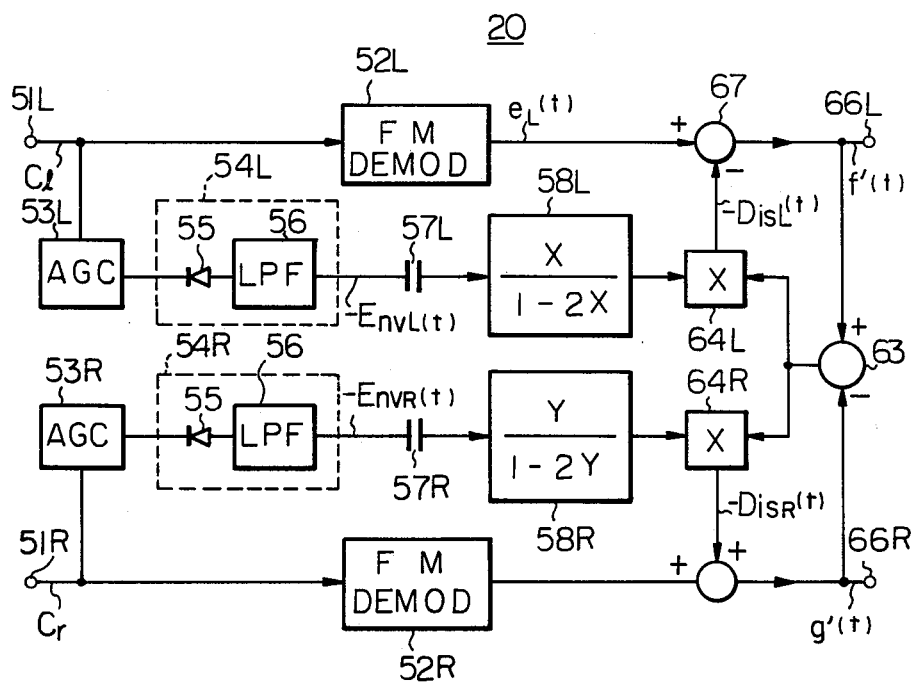
FIG. 3 is an illustration of a second embodiment of the invention.
Figure 4:
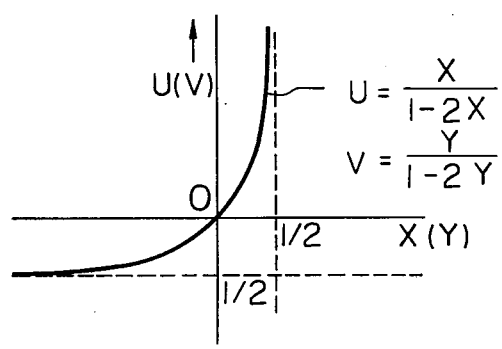
FIG. 4 is a graphic illustration of waveform converters of FIG. 3.
Figure 5:
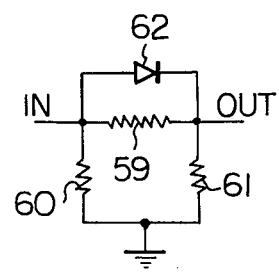
FIG. 5 is an illustration of the details of the waveform converters.

FIG. 3 is a schematic diagram of an embodiment which realizes the alternative method of distortion elimination. The input left and right signals $C_l$ and $C_r$ are applied through input terminals 51L and 51R to FM demodulators 52L and 452R, respectively, so that the output signals from the demodulators are the signals $e_L(t)$ and $e_R(t)$ given by Equations 9L and 9R. The input signals are also applied through AGC circuits 53L and 53R to envelope detectors 54L and 54R, respectively. Each of these envelope detectors includes a diode 55 and a low pass filter 56 connected in series to generate a negative sign envelope signal $-E_{nVL}(t)$ and $-E_{nVR}(t)$. DC blocking capacitors 57L and 57R are connected to the envelope detectors 54L and 54R to pass the polarity-inverted, high frequency signal components represented by the second terms of Equations 10L and 10R to waveform converters 58L and 58R, respectively. The waveform converter 58L is designed to exhibit a nonlinear input-output characteristic as shown in FIG. 4 so as to impart a waveform conversion of $X/1(1-2X)$ to the input signal. Likewise, the waveform converter 58R is designed to have a nonlinear input-output characteristic as shown in FIG. 4 so as to impart a waveform conversion of $Y/(1-2Y)$ to the input signal applied thereto. Each of these waveform converters can be realized by a circuit as shown in FIG. 5 including a resistor 59 connected in series between the input and output terminals of each waveform converter, and in parallel with a diode 62. Resistors 60 and 61 are connected in parallel with diode 62, with resistors 60 and 61 being provided at the input and output sides of the resistor 59.

Across the output terminals 66L and 66R is connected a subtractor 63 to provide a difference signal $f'(t) - g'(t)$ to analog multipliers 64L and 64R. Multiplier 64L provides multiplication of the signal $f'(t) - g'(t)$ with the waveform-converted signal from converter 58L, so that its output represents the distortion component $-D_{isL}(t)$. This distortion component is applied to a subtractor 67 where it is combined with the output from the demodulator 52L to cancel the distortion component contained in the demodulator output $e_L(t)$ given by Equation 8L. The output of the subtractor 67 is a distortionless signal $f'(t)$ and applied to the output terminal 66L. Likewise multiplier 64R provides multiplication of the signal $f'(t) - g'(t)$ with the waveform-converted signal from converter 58R to generate a signal representing the distortion component $-D_{isR}(t)$, which distortion component is applied to an adder 68 to cancel the distortion component of the signal $e_R(t)$ supplied from the demodulator 52R to supply a distortionless signal $g'(t)$ to the output terminal 66R.

It will be appreciated from the above discussion that the interference distortion present in the frequency-demodulated signal is cancelled partly by signals derived from the envelope of the interference affected FM signal and partly by means of a closed-loop feedback circuit which is cross-coupled with the adjacent channel output terminal.

The effect of the automatic gain control circuits described in connection with the previous embodiments is to compensate for the varying sensitivity of the transducer 10 due to aging or replacement of thereof with a new one. If the amplitude of the transducer 10 output varies with the transducer's sensitivity, the detected envelope representative signals would have different amplitude which would result in generating inappropriate compensating signals. Each of the automatic gain control circuits provides higher amplification for input signals having a low average amplitude and smaller amplification for input signals having a higher average amplitude so that transucer 10 operates as if it has a constant sensitivity irrespective of the aging or other influencing factors.

What is claimed is:

1. In a sound reproduction system for quadraphonic records having first and second physically separated sound tracks respectively containing first and second signals frequency-modulated on a same carrier frequency, said system including first and second channels including first and second frequency demodulators for demodulating said first and second frequency-modulated signals respectively and crosstalk paths between said first and second channels to produce an interference distortion in each of said frequency-modulated signals, apparatus for cancelling said interference distortion comprising:

first and second input terminals to which said first and second frequency-modulated signals are respectively applied;

first and second output terminals from which first and second distortionless frequency-demodulated signals are delivered;

first and second means connected to said first and second input terminals respectively for detecting the envelopes of said first and second frequency-modulated signals;

first and second means for eliminating the DC components of the detected envelopes respectively and varying the magnitude of said DC-eliminated envelopes; and first and second closed-loop feedback circuits cross-coupled between said first and second output terminals including a common arithmetic circuit having its input terminals connected to said first and second output terminals, said first feedback circuit including a first multiplier for providing multiplication of the output of said common arithmetic circuit and the output from said first magnitude-varying means and a second arithmetic circuit for combining the output of said first multiplier and the output of said first frequency demodulator and applying its output to said first output terminal, and said second feedback circuit including a second multiplier for providing multiplication of the output of said common arithmetic circuit and the output from said second magnitude-varying means and a third arithmetic circuit for combining the output of said second multiplier and the output of said second frequency demodulator and applying its output to said second output terminal.

2. The apparatus of claim 1, wherein each of said first and second envelope detectors comprises a squaring circuit and a lowpass filter connected in series to generate an output representative of the squared value of the envelope of a respective one of said first and second frequency-modulated signals.

3. The apparatus of claim 1, wherein each of said first and second envelope detectors comprises a diode and a lowpass filter connected in a series circuit thereto.

4. The apparatus of claim 1, further comprising a first automatic gain control circuit connected between the first input terminal and said first envelope detector and a second automatic gain control circuit connected between the second input terminal and said second envelope detector.

5. The apparatus of claim 1, wherein each of said first and second means for eliminating the DC components and varying the magnitude comprises a DC blocking capacitor and a variable resistor connected in a series circuit thereto.

6. The apparatus of claim 1, wherein said first means for eliminating the DC components and varying the magnitude comprises a DC blocking capacitor and a waveform converter having a characteristic represented by $X/(1-2X)$ wherein $X = K_R \cos \{f(t) - g(t) - \theta_R\}$, where $K_R$ is a crosstalk ratio of said crosstalk path from said second to first channels, $f(t)$ and $g(t)$ respectively representing the first and second audio signals of said first and second channels and $\theta_R$ representing a phase shift of said crosstalk path from said second to first channels, and said second means for eliminating the DC components and varying the magnitude comprises a DC blocking capacitor and a waveform converter having a characteristic represented by $Y/(1-2Y)$ wherein $Y = K_L \cos \{f(t) - g(t) - \theta_L\}$, where $K_L$ is a crosstalk ratio of said crosstalk path from said first to second channels, and $\theta_L$ representing a phase shift of said crosstalk path from said first to second channels, wherein each of said $K_R$ and $K_L$ is smaller than unity.

7. The apparatus of claim 1, wherein said common arithmetic circuit of said feedback circuits comprises an adder.

8. The apparatus of claim 7, wherein each of said second and third arithmetic circuits comprises a subtractor.

9. The apparatus of claim 1, wherein said common arithmetic circuit of said feedback circuits comprises a subtractor.

10. The apparatus of claim 9, wherein said second arithmetic circuit comprises a subtractor and said third arithmetic circuit comprises an adder.

11. In a sound reproduction system for quadraphonic records having first and second physically separated sound tracks respectively containing first and second signals frequency-modulated on a same carrier frequency, said system including first and second channels including first and second frequency demodulators for demodulating said first and second frequency-modulated signals respectively and crosstalk paths between said first and second channels to produce an interference distortion in each of said frequency-modulated signals, apparatus for cancelling said interference distortion comprising:

first and second input terminals to which said first and second frequency-modulated signals are respectively applied;

first and second output terminals from which first and second distortionless frequency-demodulated signals are delivered;

first and second envelope detectors connected to said first and second input terminals respectively, each including a lowpass filter and a squaring circuit to provide an output representative of the square value of the envelope of each of said frequency-modulated signals;

first and second multipliers providing multiplication of said first frequency-demodulated signal and said square value of the detected envelope of said first frequency-modulated signal, and providing multiplication of said second frequency-demodulated signal and said square value of the detected envelope of said second frequency-modulated signal;

first and second DC blocking capacitors for eliminating the DC components of the outputs from said first and second envelope detectors respectively;

first and second means for attenuating the signal level of the DC-eliminated signals to a 50% of the signal level at the input thereof; and first and second closed-loop feedback circuits cross-coupled between said first and second output terminals and including an adder having first and second input terminals connected to said first and second output terminals, a third multiplier in said first feedback circuit for providing multiplication of the output of said adder and the output of said first attenuating means, a fourth multiplier in said second feedback circuit for providing multiplication of the outputs of said adder and said second attenuating means, a first subtractor in said first feedback circuit for detecting the difference between the output of said first multiplier and the output of said third multiplier and applying the difference representative output to said first output terminal, and a second subtractor in said second feedback circuit for detecting the difference between the output of said second multiplier and the output of said fourth multiplier and applying the difference representative output to said second output terminal.

12. The apparatus of claim 11, further comprising a first automatic gain control circuit connected between said first input terminal and said first envelope detector and a second automatic gain control circuit connected between said second input terminal and said second envelope detector.

13. In a sound reproduction system for quadraphonic records having first and second physically separated sound tracks respectively containing first and second signal frequency-modulated on a same carrier frequency, said system including first and second channels including first and second frequency demodulators respectively for demodulating said first and second frequency-modulated signals and crosstalk path between said first and second channels to produce an interference distortion in each of said frequency-modulated signals, apparatus for cancelling said interference distortion comprising:

first and second input terminals to which said first and second frequency-modulated signals are respectively applied;

first and second output terminals from which first and second distortionless frequency-demodulated signals are delivered;

first and second lowpass filters connected respectively to said first and second input terminals to detect the envelope of said first and second frequency-modulated signals;

first and second DC blocking capacitors for eliminating the DC components of the outputs from said first and second lowpass filters respectively;

a first waveform converter having a characteristic of $X/(1-2X)$ where $X=K_R \cos \{f(t)-g(t)-\theta_R\}$ wherein $K_R$ is a crosstalk ratio of said crosstalk path from the second to first channels, f(t) and g(t) respectively representing the first and second audio signals of said first and second channels and $\theta_R$ representing a phase shift of said crosstalk path from the second to first channels, and a second waveform converter having a characteristic of $Y/(1-2Y)$ where $Y=K_L \cos \{f(t)-g(t)-\theta_L\}$ wherein $K_L$ is a crosstalk ratio of said crosstalk path from said first to second channels, and $\theta_L$ representing a phase shift of said crosstalk path from said first to second channels wherein each of said $K_R$ and $K_L$ is smaller than unity; and first and second closed-loop feedback circuits cross-coupled between said first and second output terminals including a common subtractor having two input terminals connected respectively to said first and second output terminals, said first feedback circuit including a first multiplier for providing multiplication of the output of said subtractor and the output of said first waveform converter and a second subtractor for detecting the difference in magnitude between the output of said first demodulator and the output of said first multiplier and applying the difference representative output to said first output terminal, said second feedback circuit including a second multiplier for providing multiplication of the output of said common subtractor and the output of said second waveform converter, and an adder for providing summation of the output of said second multiplier and the output from said second frequency demodulator and applying the summation output to said second output terminal.

14. The apparatus of claim 13, further comprising a first automatic gain control circuit connected between said first input terminal and said first lowpass filter and a second automatic gain control circuit connected between said second input terminal and said second lowpass filter.

* * * * *